US010774161B2

(12) United States Patent
Dooley et al.

(10) Patent No.: US 10,774,161 B2
(45) Date of Patent: Sep. 15, 2020

(54) SYSTEMS AND METHODS FOR POLYETHYLENE RECOVERY WITH LOW VOLATILE CONTENT

(71) Applicant: Chevron Phillips Chemical Company LP, The Woodlands, TX (US)

(72) Inventors: Kenneth A. Dooley, Porter, TX (US); Jeffrey S. Lowell, Huffman, TX (US); Joseph A. Curren, Houston, TX (US); Scott E. Kufeld, Houston, TX (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 26 days.

(21) Appl. No.: 16/263,010

(22) Filed: Jan. 31, 2019

(65) Prior Publication Data

US 2020/0247919 A1    Aug. 6, 2020

(51) Int. Cl.
*C08F 6/10* (2006.01)
*C08F 6/00* (2006.01)
*B01J 19/24* (2006.01)
*C08F 2/34* (2006.01)

(52) U.S. Cl.
CPC ............. *C08F 6/10* (2013.01); *B01J 19/2435* (2013.01); *C08F 2/34* (2013.01); *C08F 6/001* (2013.01); *C08F 6/006* (2013.01)

(58) Field of Classification Search
USPC ................................ 528/480, 481, 482, 483
See application file for complete search history.

(56) References Cited

U.S. PATENT DOCUMENTS

| | | |
|---|---|---|
| 2,825,721 A | 3/1958 | Hogan et al. |
| 3,119,569 A | 1/1964 | Baricordi |
| 3,225,023 A | 12/1965 | Hogan et al. |
| 3,226,205 A | 12/1965 | Rohlfing et al. |
| 3,242,099 A | 3/1966 | Manyik et al. |
| 3,248,179 A | 4/1966 | Norwood |
| 3,622,521 A | 11/1971 | Hogan et al. |
| 3,625,864 A | 12/1971 | Horvath |
| 3,887,494 A | 6/1975 | Dietz |
| 3,900,457 A | 8/1975 | Witt |
| 3,976,632 A | 8/1976 | Delap |
| 4,053,436 A | 10/1977 | Hogan et al. |
| 4,081,407 A | 3/1978 | Short et al. |
| 4,151,122 A | 4/1979 | McDaniel et al. |
| 4,182,815 A | 1/1980 | McDaniel et al. |
| 4,247,421 A | 1/1981 | McDaniel et al. |
| 4,248,735 A | 2/1981 | McDaniel et al. |
| 4,296,001 A | 10/1981 | Hawley |
| 4,297,460 A | 10/1981 | McDaniel et al. |
| 4,301,034 A | 11/1981 | McDaniel |
| 4,339,559 A | 7/1982 | McDaniel |
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,766 A | 8/1983 | Hawley et al. |
| 4,397,769 A | 8/1983 | McDaniel et al. |
| 4,405,501 A | 9/1983 | Witt |
| 4,444,962 A | 4/1984 | McDaniel et al. |
| 4,444,964 A | 4/1984 | McDaniel et al. |
| 4,444,965 A | 4/1984 | McDaniel et al. |
| 4,460,756 A | 7/1984 | McDaniel et al. |
| 4,501,885 A | 2/1985 | Sherk et al. |
| 4,504,638 A | 3/1985 | McDaniel et al. |
| 4,547,557 A | 10/1985 | McDaniel |
| 4,588,790 A | 5/1986 | Jenkins, III et al. |
| 4,735,931 A | 4/1988 | McDaniel et al. |
| 4,806,513 A | 2/1989 | McDaniel et al. |
| 4,808,561 A | 2/1989 | Welborn, Jr. |
| 4,820,785 A | 4/1989 | McDaniel et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,037,911 A | 8/1991 | McDaniel et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,275,992 A | 1/1994 | Mitchell et al. |
| 5,347,026 A | 9/1994 | Patsidis et al. |
| 5,352,749 A | 10/1994 | DeChellis et al. |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |

(Continued)

FOREIGN PATENT DOCUMENTS

WO    2004000891 A1    12/2003

OTHER PUBLICATIONS

International Search Report and Written Opinion issued in corresponding application No. PCT/US20/13775, dated May 13, 2020, 28 pages.

*Primary Examiner* — Terressa Boykin
(74) *Attorney, Agent, or Firm* — Merchant & Gould P.C.

(57) ABSTRACT

The present invention discloses methods for removing volatile components from an ethylene polymer effluent stream from a polymerization reactor, and related polyethylene recovery and volatile removal systems. In these methods and systems, the polymer solids temperature is increased significantly prior to introduction of the polymer solids into a purge column for the final stripping of volatile components from the polymer solids.

20 Claims, 2 Drawing Sheets

(56) References Cited

U.S. PATENT DOCUMENTS

| | | |
|---|---|---|
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,610,247 A | 3/1997 | Alt et al. |
| 5,627,247 A | 5/1997 | Alt et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 6,239,235 B1 | 5/2001 | Hottovy et al. |
| 6,262,191 B1 | 7/2001 | Hottovy et al. |
| 6,300,271 B1 | 10/2001 | McDaniel et al. |
| 6,355,594 B1 | 3/2002 | McDaniel et al. |
| 6,395,666 B1 | 5/2002 | McDaniel et al. |
| 6,548,442 B1 | 4/2003 | McDaniel et al. |
| 6,613,712 B1 | 9/2003 | McDaniel et al. |
| 6,653,416 B2 | 11/2003 | McDaniel et al. |
| 6,831,141 B2 | 12/2004 | McDaniel et al. |
| 6,833,338 B2 | 12/2004 | McDaniel et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,109,290 B2 | 9/2006 | McElvain et al. |
| 7,199,073 B2 | 4/2007 | Martin et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,417,097 B2 | 8/2008 | Yu et al. |
| 7,517,939 B2 | 4/2009 | Yang et al. |
| 7,531,606 B2 | 5/2009 | Hendrickson |
| 7,598,327 B2 | 10/2009 | Shaw |
| 7,619,047 B2 | 11/2009 | Yang et al. |
| 7,910,689 B2 | 3/2011 | Smith |
| 7,919,639 B2 | 4/2011 | Murray et al. |
| 8,080,681 B2 | 12/2011 | Murray et al. |
| 8,822,608 B1 | 9/2014 | Bhandarkar et al. |
| 2006/0287442 A1 | 12/2006 | McElvain et al. |

US 10,774,161 B2

SYSTEMS AND METHODS FOR POLYETHYLENE RECOVERY WITH LOW VOLATILE CONTENT

FIELD OF THE INVENTION

The present disclosure relates to polyethylene recovery and volatile removal systems and to methods for removing volatile components from an ethylene polymer effluent stream from a polymerization reactor, and more particularly, relates to such systems and methods in which the polymer solids temperature is significantly increased prior to introduction of the polymer solids into a purge column for stripping of volatile components from the polymer solids.

BACKGROUND OF THE INVENTION

In many systems and methods for volatile component removal, a purge column is utilized, but often the polymer solids temperature entering the purge column is unacceptably low, resulting in poor volatile removal, long residence times, and large column sizes in order to meet a desired final volatile content of, for example, less than 100 ppmw (ppm by weight) of volatile components.

Thus, the present invention is generally directed to systems and methods for significantly increasing the temperature of the polymer solids entering the purge column.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Polyethylene recovery and volatile removal systems are described herein. One such system can comprise (a) a flash chamber for reducing the pressure of an ethylene polymer effluent stream from an ethylene polymerization reactor and for removing a first portion of volatile components from polymer solids, wherein the flash chamber is configured to form the polymer solids at a solids temperature from about 10° F. to about 50° F. less than a reaction temperature in the ethylene polymerization reactor, (b) a fluidized bed heater for fluidizing the polymer solids and for heating the polymer solids to a solids temperature from at least about 10° F. above the solids temperature in (a) and up to about 20° F. greater than the reaction temperature, wherein the fluidized bed heater is configured to remove a second portion of the volatile components, and (c) a purge column for contacting the polymer solids with a stripping gas, wherein the purge column is configured to remove a third portion of the volatile components to form a polymer solids stream containing less than 100 ppmw (ppm by weight) of volatile components.

Another polyethylene recovery and volatile removal system consistent with aspects of this invention can comprise (A) a heated fluidized bed flash chamber for heating and for reducing the pressure of an ethylene polymer effluent stream from an ethylene polymerization reactor, and for removing an initial portion of volatile components from polymer solids, wherein the heated fluidized bed flash chamber is configured to form the polymer solids at a solids temperature from about 30° F. less to about 20° F. greater than a reaction temperature in the ethylene polymerization reactor, and (B) a purge column for contacting the polymer solids with a stripping gas, wherein the purge column is configured to remove a final portion of the volatile components to produce a polymer solids stream containing less than 100 ppmw of volatile components.

Methods for removing volatile components from an ethylene polymer effluent stream from an ethylene polymerization reactor also are provided herein. One such method can comprise (i) reducing the pressure of the effluent stream to remove a first portion of the volatile components from polymer solids, the polymer solids having a solids temperature from about 10° F. to about 50° F. less than a reaction temperature in the ethylene polymerization reactor, (ii) fluidizing the polymer solids while heating to increase the solids temperature from at least about 10° F. above the solids temperature in step (i) and up to about 20° F. greater than the reaction temperature, and wherein a second portion of the volatile components are removed, and (iii) contacting the polymer solids with a stripping gas to remove a third portion of the volatile components to form a polymer solids stream containing less than 100 ppm by weight of volatile components.

Consistent with another aspect of the invention is a method for removing volatile components from an ethylene polymer effluent stream from an ethylene polymerization reactor, in which the method can comprise (I) contacting the effluent stream with a fluidizing gas at a reduced pressure while heating to remove an initial portion of the volatile components from polymer solids, the polymer solids having a solids temperature from about 30° F. less to about 20° F. greater than a reaction temperature in the ethylene polymerization reactor, and (II) contacting the polymer solids with a stripping gas to remove a final portion of the volatile components to form a polymer solids stream containing less than 100 ppm by weight of volatile components.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

DEFINITIONS

Figure 1:
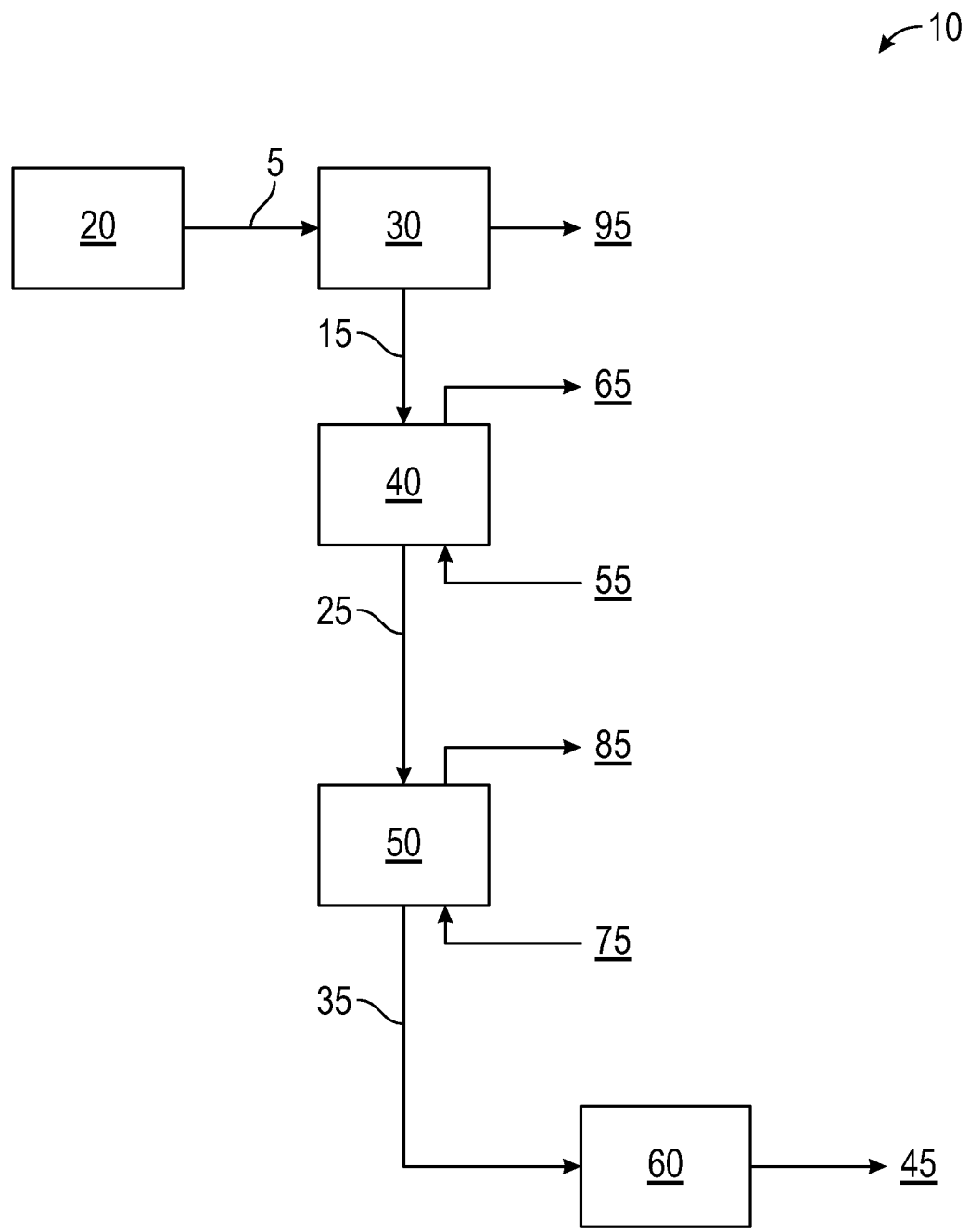
FIG. 1 illustrates a polyethylene recovery and volatile removal system consistent with an aspect of the present invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied.

To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the systems, compositions, processes, or methods described herein are contemplated with or without explicit description of the particular combination. Additionally, unless explicitly recited otherwise, any aspect or feature disclosed herein can be combined to describe inventive systems, compositions, processes, or methods consistent with the present disclosure.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting," "combining," and the like are used herein to describe systems and methods in which the materials are contacted or combined together in any order, in any manner, and for any length of time, unless otherwise specified. For example, the materials can be contacted or combined by blending, mixing, fluidizing, and the like, using any suitable technique.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene), as well as ULDPE, VLDPE, LDLPE, and the like. As an example, an ethylene copolymer can be derived from ethylene and a comonomer, such as propylene, 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers or oligomers. The intent is for the term "polymer" to encompass oligomers (including dimers and trimers) derived from any olefin monomer disclosed herein (as well from an olefin monomer and one olefin comonomer, an olefin monomer and two olefin comonomers, and so forth).

In this disclosure, while systems and methods are described in terms of "comprising" various components or steps, the systems and methods also can "consist essentially of" or "consist of" the various components or steps, unless stated otherwise.

The terms "a," "an," and "the" are intended to include plural alternatives, e.g., at least one. For instance, the disclosure of "a reactor" is meant to encompass one reactor, or combinations of more than one reactor, unless otherwise specified.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the temperature of polymer solids can be in certain ranges in various aspects of this invention. By a disclosure that the temperature of the polymer solids can be from about 10° F. to about 50° F. less than a reaction temperature in the ethylene polymerization reactor, the intent is to recite that the solids temperature can be any temperature in the range and, for example, can be equal to about 10° F. less, about 15° F. less, about 20° F. less, about 25° F. less, about 30° F. less, about 35° F. less, about 40° F. less, about 45° F. less, or about 50° F. less, than the reaction temperature. Additionally, the temperature can be within any range from about 10° F. to about 50° F. less (for example, from about 15° F. to about 35° F. less), and this also includes any combination of ranges between about 10° F. and about 50° F. less than the reaction temperature. Further, in all instances, where "about" a particular value is disclosed, then that value itself is disclosed. Thus, the disclosure that the temperature of the polymer solids can be from about 10° F. to about 50° F. less than the reaction temperature also discloses a solids temperature of 10° F. to 50° F. less than the reaction temperature (for example, from 15° F. to 35° F. less), and this also includes any combination of ranges between 10° F. and 50° F. less than the reaction temperature. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, and often within 5% of the reported numerical value.

Although any methods, systems, steps, and components similar or equivalent to those described herein can be used in the practice or testing of the invention, the typical methods, systems, steps, and components are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Disclosed herein are polyethylene recovery and volatile removal systems, and methods for removing volatile components from an ethylene polymer effluent stream from a polymerization reactor. In conventional systems and methods, the residence time in the purge column and the amount of stripping gas being used to purge the polymer solids can limit the ability of the column to remove volatile hydrocarbon components sufficiently to meet safe handling or environmental restrictions, particularly as polymer production rates are increased and lower density ethylene polymers are produced. Further, purge column sizes often cannot be increased due to cost or physical space limitations.

Moreover, desorption of volatile components from the polymer solids in the flash chamber causes a reduction in the temperature of the polymer solids. However, higher polymer solids temperatures in the purge column are necessary to increase the diffusion rate of volatile hydrocarbons and to partition or transfer more hydrocarbons into the stripping gas. The velocity or flow rate of the stripping gas should be high enough to remove the hydrocarbons, but the solids temperatures cannot be too high during volatile removal, or the ethylene polymer will soften and plug, agglomerate, or stick to equipment surfaces.

While not wishing to be bound by theory, it is believed that simply heating the stripping gas in the purge column does not provide sufficient energy to significantly increase the temperature of the solids and efficiently remove volatile components; the weight ratio of the stripping gas to the polymer solids is too low and the heat capacity of the stripping gas is generally less than that of the polymer solids.

Advantageously, the disclosed systems and methods overcome the drawbacks noted above, and in particular, result in a significant increase in the polymer solids temperature entering the purge column for efficient stripping of volatile components. It was unexpectedly found that an increase in solids temperature in the purge column can both increase the diffusivity of volatile hydrocarbon components in the solid ethylene polymer and increase the partitioning or transfer of the volatile hydrocarbon components from the polymer solids to the stripping gas. These dual impacts can result in an unexpected 10-fold reduction in volatile content for a ~10° F. increase in solids temperature. As an example, at a solids temperature of 150° F. and a 1 hour residence time in the purge column, the volatile content leaving the purge column can be 100 ppmw, whereas for a solids temperature of 160° F. (under the same purge column operating conditions), the volatile content leaving the purge column can be reduced to less than 10 ppmw.

Another benefit of the increase in solids temperature is the ability to significantly reduce the purge column size without sacrificing volatile removal capacity. It is estimated that column sizes can be reduced by 50% to 75-80%, or more. Likewise, with existing purge columns, the residence time can be reduced significantly without sacrificing volatile removal capacity. It is estimated that 4-fold reductions can be achieved; for example, a 4-hour residence time in the purge column can be reduced to 1 hour, or a 1-hour residence time can be reduced to 15 minutes. Further benefits can include the use of lower quantities of stripping gas in the purge column, and lower emissions and lower volatile contents of the ethylene polymer solids, among others. The stripping gas can be recovered, recycled, or reused in the disclosed systems and methods.

Also in the disclosed systems and methods, a catalyst deactivating agent can be added to the ethylene polymer effluent stream prior to the flash chamber. This is not required, however, and beneficially, a catalyst deactivating agent is not added prior to the flash chamber. Rather, the catalyst deactivating agent can be can be introduced advantageously along with the fluidizing gas (in the fluidized bed heater) or with the stripping gas (in the purge column), without detrimental plugging or agglomeration of polymer solids. Alternatively, the catalyst deactivating agent can be injected into the polymer solids stream after the purge column. The catalyst deactivating agent can act on any component (e.g., activator, co-catalyst, transition metal component) of the catalyst composition.

Removing Volatile Components

Aspects of this invention are directed to a method for removing volatile components from an ethylene polymer effluent stream from an ethylene polymerization reactor. For example, a first method can comprise (i) reducing the pressure of the effluent stream to remove a first portion of the volatile components from polymer solids, the polymer solids having a solids temperature from about 10° F. to about 50° F. less than a reaction temperature in the ethylene polymerization reactor, (ii) fluidizing the polymer solids while heating to increase the solids temperature from at least about 10° F. above the solids temperature in step (i) and up to about 20° F. greater than the reaction temperature, and wherein a second portion of the volatile components are removed, and (iii) contacting the polymer solids with a stripping gas to remove a third portion of the volatile components to form a polymer solids stream containing less than 100 ppm by weight of volatile components. In another aspect, a second method can comprise (I) contacting the effluent stream with a fluidizing gas at a reduced pressure while heating to remove an initial portion of the volatile components from polymer solids, the polymer solids having a solids temperature from about 30° F. less to about 20° F. greater than a reaction temperature in the ethylene polymerization reactor, and (II) contacting the polymer solids with a stripping gas to remove a final portion of the volatile components to form a polymer solids stream containing less than 100 ppm by weight of volatile components. Generally, the features of the first and second methods (e.g., the reaction temperature, the solids temperature, the stripping gas, and the amount of volatile components, among others) are independently described herein and these features can be combined in any combination to further describe the disclosed methods for removing volatile components. Moreover, additional process steps can be performed before, during, and/or after the steps of these methods, and can be utilized without limitation and in any combination to further describe the first and second methods for removing volatile components, unless stated otherwise.

Referring now to the first method, in which the ethylene polymer effluent stream from the ethylene polymerization reactor contains polymer solids and volatile components. While not limited thereto, the volatile content of the ethylene polymer effluent stream can range from about 5 to about 25 wt. %, or from about 7 to about 15 wt. %, volatile components (e.g., nitrogen, ethylene, comonomer if used, hydrogen if used, inert hydrocarbon condensing agent, etc.) when the ethylene polymerization reactor is a gas phase reactor. The volatile content is normally much higher when the ethylene polymerization reactor is a loop slurry reactor, and the volatile content of the ethylene polymer effluent stream often can range from about 35 to about 70 wt. %, or from about 45 to about 65 wt. %, of volatile components (e.g., ethylene, comonomer if used, hydrogen if used, hydrocarbon diluent such as isobutane, etc.).

In step (i), when the ethylene polymerization reactor is a gas phase reactor, the pressure can be reduced to about 2 about 10 psig, or to about 3 to about 8 psig, and after the first portion of the volatile components is removed, the resultant polymer solids can contain from about 0.5 to about 5 wt. % volatile components, or from about 1 to about 4 wt. % volatile components. The resultant polymer solids in step (i) typically can have a solids temperature that is from about 10° F. to about 20° F., or from about 12° F. to about 18° F., less than the reaction temperature in the ethylene polymerization reactor, when the ethylene polymerization reactor is a gas phase reactor.

In step (i), when the ethylene polymerization reactor is a loop slurry reactor, the pressure can be reduced to about 2 about 400 psig, to about 2 to about 10 psig, or to about 100 to about 200 psig, and after the first portion of the volatile components is removed, the resultant polymer solids can contain from about 0.5 to about 10 wt. % volatile components, or from about 1 to about 8 wt. % volatile components. In step (i), the polymer solids in the flash chamber typically have a solids temperature that is from 5° F. to 30° F. less than the reaction temperature in the ethylene polymerization reactor. In some instances, the resultant polymer solids from step (i) typically are part of an exit stream in which the pressure is further reduced to about 5 psig, about 10 psig, or about 25 psig. The resultant polymer solids after step (i) typically can have a solids temperature that is from about 30° F. to about 50° F., or from about 35° F. to about 45° F., less than the reaction temperature in the ethylene polymerization reactor, when the ethylene polymerization reactor is a loop slurry reactor.

The polymer solids from step (i) can be fluidized while heating in step (ii), which can increase the solids temperature to at least about 10° F. above the solids temperature in step (i) and up to about 20° F. greater than the reaction temperature. Further, a second portion of the volatile components is removed in step (ii). While volatile removal is not the primary objective of step (ii), any suitable amount of volatile components can be removed, for example, the polymer solids resulting from step (ii) can contain from about 1% to about 20%, or from about 2% to about 15%, less volatile components than the polymer solids resulting from step (i).

Beneficially, step (ii) can be performed in a relatively short period of time. Step (ii) can be conducted for a time period that typically falls within a range of from about 1 minute to about 30 minutes, from about 1 minute to about 20 minutes, from about 2 minutes to about 20 minutes, or from about 2 minutes to about 10 minutes.

Any suitable fluidizing gas can be used in step (ii). For instance, the polymer solids can be fluidized with a fluidizing gas comprising nitrogen (or other inert gas), ethylene, flash chamber gas, a recycled fraction of the second portion of the volatile components removed in step (ii), and the like, as well as combinations thereof. The flash chamber gas can be a portion of the volatile components removed from the polymer solids in step (i) of the first method of this invention. The temperature of the fluidizing gas is not particularly limited, so long as the gas temperature is sufficient to significantly increase the temperature of the polymer solids. Often, the fluidizing gas temperature ranges from about 10° F. less than to about 20° F. greater than the reaction temperature.

The fluidizing/heating process in step (ii) can increase the solids temperature from at least about 10° F. above (or from at least about 15° F. above, or from at least about 20° F. above) the solids temperature in step (i), and up to about 20° F. greater (or up to about 15° F. greater, or up to about 10° F. greater) than the reaction temperature. Generally, the maximum solids temperature is limited by the vicat softening temperature and/or by the peak melting temperature of the particular ethylene polymer.

In step (iii), the polymer solids—which were heated in step (ii)—can be contacted with a stripping gas to remove a third portion of the volatile components to form a polymer solids stream containing less than 100 ppm by weight of volatile components. In one aspect, the third portion of volatile components is removed to form the polymer solids stream containing less than about 40 ppmw of volatile components, while in another aspect, the polymer solids stream contains less than about 20 ppmw of volatile components, and in yet another aspect, the polymer solids stream contains less than about 10 ppmw of volatile components.

Step (iii) generally can be performed at relatively low pressures. For instance, step (iii) can be conducted at a pressure in a range from about 0 psig to about 10 psig, or from about 0 psig to about 5 psig. Step (iii) typically is conducted for any time period sufficient to reduce the volatile content to a desired amount (e.g., less than 100 ppmw, less than 20 ppmw, etc.), and due to the much higher solids temperature resulting from step (ii), step (iii) can be conducted for a time period that typically falls within a range of from about 15 minutes to about 180 minutes, from about 15 minutes to about 90 minutes, from about 15 minutes to about 60 minutes, from about 20 minutes to about 60 minutes, or from about 15 minutes to about 50 minutes.

Any suitable stripping gas can be used in step (iii). For instance, the polymer solids can be contacted with a stripping gas comprising nitrogen (or other inert gas), ethylene, and the like, as well as combinations thereof. The temperature of the stripping gas is not particularly limited, but often contacts the polymer solids at a temperature that is from about 15° F. less than to about 15° F. greater than the reaction temperature. In some aspects, stripping gas at ambient temperature and up to about 150° F. can be used.

Referring now to the second method, in which the ethylene polymer effluent stream from the ethylene polymerization reactor contains polymer solids and volatile components. Similar to the first method, and while not limited thereto, the volatile content of the ethylene polymer effluent stream in the second method can range from about 5 to about 25 wt. %, or from about 7 to about 15 wt. %, volatile components when the ethylene polymerization reactor is a gas phase reactor. The volatile content is normally much higher when the ethylene polymerization reactor is a loop slurry reactor, and the volatile content of the ethylene polymer effluent stream in the second method often can range from about 35 to about 70 wt. %, or from about 45 to about 65 wt. %, of volatile components.

In step (I) of the second method, the effluent stream can be contacted with a fluidizing gas at a reduced pressure while heating to remove an initial portion of the volatile components from the polymer solids, the resultant polymer solids having a solids temperature from about 30° F. less to about 20° F. greater than a reaction temperature in the ethylene polymerization reactor. Any suitable pressure can be used in step (I), but generally the pressure is in a range from about 1 about 20 psig in some aspects, and from about 2 to about 15 psig in other aspects.

After the initial portion of the volatile components is removed, the resultant polymer solids can contain from about 0.5 to about 5 wt. % volatile components, or from about 1 to about 4 wt. % volatile components, when the ethylene polymerization reactor is a gas phase reactor. When the ethylene polymerization reactor is a loop slurry reactor, the resultant polymer solids can contain from about 0.5 to about 10 wt. % volatile components, or from about 1 to about 8 wt. % volatile components.

The resultant polymer solids in step (I)—after fluidizing and heating at a reduced pressure—can have a significantly increased temperature. Often, the solids temperature can be from about 20° F. less (or from about 15° F. less, or from about 10° F. less) than the reaction temperature in the ethylene polymerization reactor, and up to about 20° F. greater (or up to about 15° F. greater, or up to about 10° F. greater) than the reaction temperature.

Beneficially, step (I) can be performed in a relatively short period of time. Step (I) can be conducted for a time period that typically falls within a range of from about 1 minute to about 30 minutes, from about 1 minute to about 20 minutes, from about 2 minutes to about 20 minutes, or from about 2 minutes to about 10 minutes.

Any suitable fluidizing gas can be used in step (I). For instance, the polymer solids can be fluidized with a fluidizing gas comprising nitrogen (or other inert gas), ethylene, propylene, butane, isobutane, a recycled fraction of the initial portion of the volatile components removed in step (I), and the like, as well as combinations thereof. The temperature of the fluidizing gas is not particularly limited, so long as the gas temperature is sufficient to significantly increase the temperature of the polymer solids. Often, the fluidizing gas temperature ranges from about 10° F. less than to about 20° F. greater than the reaction temperature.

Step (II) of the second method can be performed as described above for step (iii) of the first process. Thus, the polymer solids—which are heated in step (I)—can be contacted with a stripping gas to remove a final portion of the volatile components to form a polymer solids stream containing less than 100 ppm by weight of volatile components; alternatively, less than about 40 ppmw of volatile components; alternatively, less than about 20 ppmw of volatile components; or alternatively, less than about 10 ppmw of volatile components. Like step (iii), step (II) generally can be performed at relatively low pressures: for example, from about 0 psig to about 10 psig, or from about 0 psig to about 5 psig. Step (II) typically is conducted for any time period sufficient to reduce the volatile content to a desired amount (e.g., less than 100 ppmw, less than 20 ppmw, etc.), and due to the much higher solids temperature resulting from step (I), step (II) can be conducted for a time period that typically falls within a range of from about 15 minutes to about 180 minutes, from about 15 minutes to about 90 minutes, from about 15 minutes to about 60 minutes, from about 20 minutes to about 60 minutes, or from about 15 minutes to about 50 minutes.

Any suitable stripping gas can be used in step (II). Therefore, the polymer solids can be contacted with a stripping gas comprising nitrogen (or other inert gas), ethylene, and the like, as well as combinations thereof. The temperature of the stripping gas is not particularly limited, but often contacts the polymer solids at a temperature that is from about 15° F. less than to about 15° F. greater than the reaction temperature. In some aspects, stripping gas at ambient temperature and up to about 150° F. can be used.

Both the first and second methods for removing volatile components from an ethylene polymer effluent stream from an ethylene polymerization reactor can further comprise a step of converting the polymer solids stream into solid polymer pellets. This can be accomplished via a pelletizing extruder or other suitable technique. This invention is also directed to, and encompasses, the solid polymer pellets produced by any of the methods and polymerization processes disclosed herein.

A catalyst deactivating agent (e.g., water, an alcohol, a natural source oil, a polyethylene glycol, a polypropylene glycol, etc.) can be incorporated into the ethylene polymer effluent stream prior to step (i) or step (I), if desired. While the catalyst deactivating agent can be added at this stage of the process, other options may be more beneficial. For instance, the stripping gas can further include a catalyst deactivating agent (e.g., air), or alternatively, the fluidizing gas can further comprise a catalyst deactivating agent, in both the first and second methods.

In another aspect, the first and second methods can further comprise a step of introducing a catalyst deactivating agent (e.g., air) into the polymer solids stream after step (iii) or step (II), for instance, before converting into solid polymer pellets via extrusion.

Polyethylene Recovery and Volatile Removal Systems

A first polyethylene recovery and volatile removal system consistent with aspects of the present invention can comprise (a) a flash chamber for reducing the pressure of an ethylene polymer effluent stream from an ethylene polymerization reactor and for removing a first portion of volatile components from polymer solids, wherein the flash chamber is configured to form the polymer solids at a solids temperature from about 10° F. to about 50° F. less than a reaction temperature of the ethylene polymerization reactor, (b) a fluidized bed heater for fluidizing the polymer solids and for heating the polymer solids to a solids temperature from at least about 10° F. above the solids temperature in (a) and up to about 20° F. greater than the reaction temperature, wherein the fluidized bed heater is configured to remove a second portion of the volatile components, and (c) a purge column for contacting the polymer solids with a stripping gas, wherein the purge column is configured to remove a third portion of the volatile components to form a polymer solids stream containing less than 100 ppmw (ppm by weight) of volatile components.

A second polyethylene recovery and volatile removal system consistent with aspects of the present invention can comprise (A) a heated fluidized bed flash chamber for heating and for reducing the pressure of an ethylene polymer effluent stream from an ethylene polymerization reactor, and for removing an initial portion of volatile components from polymer solids, wherein the heated fluidized bed flash chamber is configured to form the polymer solids at a solids temperature from about 30° F. less to about 20° F. greater than a reaction temperature of the ethylene polymerization reactor, and (B) a purge column for contacting the polymer solids with a stripping gas, wherein the purge column is configured to remove a final portion of the volatile components to produce a polymer solids stream containing less than 100 ppmw of volatile components.

Generally, the features of the first and second systems (e.g., the flash chamber, the fluidized bed heater, the purge column, and the heated fluidized bed flash chamber, among others) are independently described herein and these features can be combined in any combination to further describe the disclosed systems for polyethylene recovery and volatile removal. Moreover, additional components or devices can be present in these systems, and can be utilized without limitation and in any combination to further describe the first and second systems for polyethylene recovery and volatile removal, unless stated otherwise.

Referring now to the first system, in which the system includes a flash chamber for reducing the pressure of an ethylene polymer effluent stream—containing polymer solids and volatile components—from an ethylene polymerization reactor. While not limited thereto, the volatile content of the ethylene polymer effluent stream can range from about 5 to about 25 wt. %, or from about 7 to about 15 wt. %, volatile components (e.g., nitrogen, ethylene, comonomer if used, hydrogen if used, inert hydrocarbon condensing agent, etc.) when the ethylene polymerization reactor is a gas phase reactor. The volatile content is normally much higher when the ethylene polymerization reactor is a loop slurry reactor, and the volatile content of the ethylene polymer effluent stream often can range from about 35 to about 70 wt. %, or from about 45 to about 65 wt. %, of volatile components (e.g., ethylene, comonomer if used, hydrogen if used, hydrocarbon diluent such as isobutane, etc.).

When the ethylene polymerization reactor is a gas phase reactor, the flash chamber can reduce the pressure to about 2 about 10 psig, or to about 3 to about 8 psig, and after the first portion of the volatile components is removed, the resultant polymer solids can contain from about 0.5 to about 5 wt. % volatile components, or from about 1 to about 4 wt. % volatile components. The polymer solids resulting from the flash chamber typically can have a solids temperature that is from about 10° F. to about 20° F., or from about 12° F. to about 18° F., less than the reaction temperature in the ethylene polymerization reactor, when the ethylene polymerization reactor is a gas phase reactor.

When the ethylene polymerization reactor is a loop slurry reactor, the flash chamber can reduce the pressure to about 2 to about 400 psig, to about 2 to about 10 psig (low pressure flash), or to about 100 about 200 psig (high pressure flash), and after the first portion of the volatile components is removed, the resultant polymer solids can contain from about 0.5 to about 10 wt. % volatile components, or from about 1 to about 8 wt. % volatile components. The polymer solids in the flash chamber typically have a solids temperature that is from 5° F. to 30° F. less than the reaction temperature in the ethylene polymerization reactor. In some instances, the resultant polymer solids often are part of an exit stream from the flash chamber in which the pressure is further reduced to about 5 psig, about 10 psig, or about 25 psig. The resultant polymer solids exiting the flash chamber typically can have a solids temperature that is from about 30° F. to about 50° F., or from about 35° F. to about 45° F., less than the reaction temperature in the ethylene polymerization reactor, when the ethylene polymerization reactor is a loop slurry reactor.

The polymer solids from the flash chamber can be fluidized while heating in the fluidized bed heater, which can increase the solids temperature from at least about 10° F. above the solids temperature exiting the flash chamber and up to about 20° F. greater than the reaction temperature. Further, a second portion of the volatile components can be removed in the fluidized bed heater. While volatile removal is not the primary objective of the fluidized bed heater, any suitable amount of volatile components can be removed, for example, the polymer solids resulting from fluidized bed heater can contain from about 1% to about 20%, or from about 2% to about 15%, less volatile components than the polymer solids exiting the flash chamber.

Beneficially, the residence time in the fluidized bed heater is relatively short. The residence time in the fluidized bed heater typically can fall within a range of from about 1 minute to about 30 minutes, from about 1 minute to about 20 minutes, from about 2 minutes to about 20 minutes, or from about 2 minutes to about 10 minutes.

Any suitable fluidizing gas can be used in the fluidized bed heater. For instance, the polymer solids can be fluidized with a fluidizing gas comprising nitrogen (or other inert gas), ethylene, flash chamber gas, a recycled fraction of the second portion of the volatile components removed in the fluidized bed heater, and the like, as well as combinations thereof. The flash chamber gas can be a portion of the volatile components removed from the polymer solids and exiting the flash chamber. The temperature of the fluidizing gas is not particularly limited, so long as the gas temperature is sufficient to significantly increase the temperature of the polymer solids. Often, the fluidizing gas temperature ranges from about 10° F. less than to about 20° F. greater than the reaction temperature.

The fluidized bed heater can increase the solids temperature from at least about 10° F. above (or from at least about 15° F. above, or from at least about 20° F. above) the solids temperature exiting the flash chamber, and up to about 20° F. greater (or up to about 15° F. greater, or up to about 10° F. greater) than the reaction temperature.

In the purge column, the polymer solids—which are heated in the fluidized bed heater—can be contacted with a stripping gas to remove a third portion of the volatile components to form a polymer solids stream containing less than 100 ppm by weight of volatile components. In one aspect, the third portion of volatile components is removed to form the polymer solids stream containing less than about 40 ppmw of volatile components, while in another aspect, the polymer solids stream contains less than about 20 ppmw of volatile components, and in yet another aspect, the polymer solids stream contains less than about 10 ppmw of volatile components.

The purge column generally operates at relatively low pressures. For instance, the purge column can be operated at a pressure in a range from about 0 psig to about 10 psig, or from about 0 psig to about 5 psig. The residence time in the purge column typically is any time period sufficient to reduce the volatile content to a desired amount (e.g., less than 100 ppmw, less than 20 ppmw, etc.), and due to the much higher solids temperature resulting from the fluidized bed heater, the residence time in the purge column can be from about 15 minutes to about 180 minutes, from about 15 minutes to about 90 minutes, from about 15 minutes to about 60 minutes, from about 20 minutes to about 60 minutes, or from about 15 minutes to about 50 minutes. Moreover, more than one purge column can be present in the system, such as two purge columns arranged in series or parallel.

Any suitable stripping gas can be used in the purge column. For instance, the polymer solids can be contacted with a stripping gas comprising nitrogen (or other inert gas), ethylene, and the like, as well as combinations thereof. The temperature of the stripping gas is not particularly limited, but often contacts the polymer solids at a temperature that is from about 15° F. less than to about 15° F. greater than the reaction temperature. In some aspects, stripping gas at ambient temperature and up to about 150° F. can be used.

Referring now to the second system, in which the ethylene polymer effluent stream from the ethylene polymerization reactor contains polymer solids and volatile components. Similar to the first system, and while not limited thereto, the volatile content of the ethylene polymer effluent stream in the second system can range from about 5 to about 25 wt. %, or from about 7 to about 15 wt. %, volatile components when the ethylene polymerization reactor is a gas phase reactor. The volatile content is normally much higher when the ethylene polymerization reactor is a loop slurry reactor, and the volatile content of the ethylene polymer effluent stream can range from about 35 to about 70 wt. %, or from about 45 to about 65 wt. %, of volatile components.

In the second system, the effluent stream enters a heated fluidized bed flash chamber, which is configured for heating and for reducing the pressure of the effluent stream, and which removes an initial portion of volatile components from the polymer solids. The resultant polymer solids can have a solids temperature from about 30° F. less to about 20° F. greater than a reaction temperature in the ethylene polymerization reactor. The heated fluidized bed flash chamber reduces the pressure to any suitable pressure, but generally the pressure is in a range from about 1 about 20 psig in some aspects, and from about 2 to about 15 psig in other aspects.

After the initial portion of the volatile components is removed via the heated fluidized bed flash chamber, the resultant polymer solids can contain from about 0.5 to about 5 wt. % volatile components, or from about 1 to about 4 wt. % volatile components, when the ethylene polymerization reactor is a gas phase reactor. When the ethylene polymerization reactor is a loop slurry reactor, the resultant polymer solids can contain from about 0.5 to about 10 wt. % volatile components, or from about 1 to about 8 wt. % volatile components.

The resultant polymer solids exiting the heated fluidized bed flash chamber—after fluidizing and heating at a reduced pressure—can have a significantly increased temperature. Often, the solids temperature can be from about 20° F. less (or from about 15° F. less, or from about 10° F. less) than the reaction temperature in the ethylene polymerization reactor, and up to about 20° F. greater (or up to about 15° F. greater, or up to about 10° F. greater) than the reaction temperature.

Beneficially, the residence time in the heated fluidized bed flash chamber is relatively short. The residence time typically falls within a range of from about 1 minute to about 30 minutes, from about 1 minute to about 20 minutes, from about 2 minutes to about 20 minutes, or from about 2 minutes to about 10 minutes.

Any suitable fluidizing gas can be used in the heated fluidized bed flash chamber. For instance, the polymer solids can be fluidized with a fluidizing gas comprising nitrogen (or other inert gas), ethylene, a recycled fraction of the initial portion of the volatile components removed in the heated fluidized bed flash chamber, and the like, as well as combinations thereof. The temperature of the fluidizing gas is not particularly limited, so long as the gas temperature is sufficient to significantly increase the temperature of the polymer solids. Often, the fluidizing gas temperature ranges from about 10° F. less than to about 20° F. greater than the reaction temperature.

The purge column in the second system can be configured as described above for the purge column in the first system. Thus, the purge column is configured to contact the polymer solids—which are heated in the fluidized bed flash chamber—with a stripping gas to remove a final portion of the volatile components to form a polymer solids stream containing less than 100 ppm by weight of volatile components; alternatively, less than about 40 ppmw of volatile components; alternatively, less than about 20 ppmw of volatile components; or alternatively, less than about 10 ppmw of volatile components. The purge column can be operated at relatively low pressures: for example, from about 0 psig to about 10 psig, or from about 0 psig to about 5 psig. The residence time in the purge column generally is any time period sufficient to reduce the volatile content to a desired amount (e.g., less than 100 ppmw, less than 20 ppmw, etc.), and due to the much higher solids temperature resulting from the heated fluidized bed flash chamber, the residence time in the purge column typically falls within a range of from about 15 minutes to about 180 minutes, from about 15 minutes to about 90 minutes, from about 15 minutes to about 60 minutes, from about 20 minutes to about 60 minutes, or from about 15 minutes to about 50 minutes.

Any suitable stripping gas can be used in the purge column. Therefore, the polymer solids can be contacted with a stripping gas comprising nitrogen (or other inert gas), ethylene, and the like, as well as combinations thereof. The temperature of the stripping gas is not particularly limited, but often contacts the polymer solids at a temperature that is from about 15° F. less than to about 15° F. greater than the reaction temperature. In some aspects, stripping gas at ambient temperature and up to about 150° F. can be used.

Both the first and second systems for polyethylene recovery and volatile removal can further include an extruder for converting the polymer solids stream into solid polymer pellets. Typically, a pelletizing extruder or other suitable device can be used. This invention is also directed to, and encompasses, the solid polymer pellets produced by any of the volatile removal systems and polymerization reactor systems disclosed herein.

Optionally, the systems can further include an injector for introducing a catalyst deactivating agent (e.g., water) into the ethylene polymer effluent stream prior to the flash chamber. While the catalyst deactivating agent can be added at this location in the systems, other options may be more beneficial. For instance, the stripping gas can further include a catalyst deactivating agent (e.g., air), or alternatively, the fluidizing gas can further comprise a catalyst deactivating agent, in both the first and second systems.

In another aspect, the first and second systems can further comprise an injector for introducing a catalyst deactivating agent (e.g., air) into the polymer solids stream after the purge column, for instance, before converting into solid polymer pellets with an extruder.

Referring now to FIG. 1, which illustrates a polyethylene recovery and volatile removal system 10 consistent with an aspect of the present invention. The system 10 can include a flash chamber 30, a fluidized bed heater 40, a purge column 50, and an extruder 60. Related to the system 10 is a reactor 20, such as a gas phase or loop slurry reactor, from which an effluent stream 5 enters the flash chamber 30 in the polyethylene recovery and volatile removal system 10. While not limited thereto, typical reaction temperatures in the reactor are in the 190 to 235° F. range for HDPE grades, and in the 170 to 200° F. range for LLDPE grades.

For a loop slurry reactor, the composition of the effluent stream 5 is a slurry containing ethylene polymer solids and approximately 45 to 65 wt. % volatile components, inclusive of diluent (e.g., isobutane) and residual monomer/comonomer. Some of the volatile components are entrained/absorbed into the ethylene polymer solids. For a gas phase reactor, the composition of the effluent stream 5 is polymer solids and approximately 7 to 15 wt. % volatile components, inclusive of a fluidizing gas and residual monomer/comonomer. As with loop slurry, some of the volatile components are entrained/absorbed into the ethylene polymer solids.

In the case of a loop slurry reactor, the effluent stream 5 can include a heated pipe—e.g., with an outer jacket containing a heating medium, such as steam—but is generally not heated for gas phase processes. Optionally, a catalyst deactivating agent can be added into effluent stream 5. Often, the catalyst deactivating agent is water, but is not limited thereto. While the catalyst deactivating agent can be added at this stage of the process, it often is avoided because any hydrocarbon-containing streams that are to be recycled to the reactor have to be purified to remove the catalyst deactivating agent (i.e., to avoid deactivating the catalyst in the reactor 20). This can involve sophisticated and expensive purification means, such as molecular sieve beds, distillation, and the like. Moreover, the equipment can be quite large and expensive due to the size of the recycle stream at this stage of the process.

In FIG. 1, the flash chamber 30 often operates at approximately 10 to 20° F. less than the reaction temperature for gas phase processes and at a pressure of approximately 2 to 10 psig, while for loop slurry processes, the flash chamber 30 typically operates at approximately 10 to 20° F. less than the reaction temperature and at a higher pressure of approximately 100 to 200 psig. Any suitable design for the flash chamber can be used, and volatile removal and solid product separation can be achieved using a cyclone design, separation by gravity, or any combination of the two together. Stream 95 is the volatile stream that exits the flash chamber (flash chamber gas).

The stream 15 exiting the flash chamber 30 enters the fluidized bed heater 40. After exiting the flash chamber 30 and prior to entering the fluidized bed heater 40, the volatile content of stream 15 has been reduced significantly, as compared to effluent stream 5. For a loop slurry reactor, stream 15 often contains ethylene polymer particles and generally 0.5 to 10 wt. % volatile components, whereas for a gas phase reactor, stream 15 often contains ethylene polymer particles and generally 0.5 to 5 wt. % volatile components. Some of the volatile components are entrained/absorbed into the ethylene polymer particles. In most cases, the stream 15 leaving the flash chamber 30 has lower volatile content from a gas phase reactor than from a loop slurry reactor.

Volatile removal often results in a temperature drop in the flash chamber 30, and in stream 15 if there is a significant pressure drop from flash chamber 30 to fluidized bed heater 40. The ethylene polymer particles in stream 15 have a temperature that is typically 30 to 50° F. less than the reaction temperature for loop slurry, and typically 10 to 20° F. less than the reaction temperature for gas phase. Temperature drop in the flash chamber for gas phase is generally not nearly as significant as for loop slurry. Optionally, stream 15 can include a heated pipe, similar to effluent stream 5, particularly for loop slurry processes. Temperature rise is very limited, due in part to space/distance limitations, pressure drop considerations, liquid hydrocarbons to vaporize, and the like.

The fluidized bed heater 40 is designed to increase the temperature of the solid ethylene polymer particles in stream 15 prior to the entering the purge column 50 via stream 25. Unexpectedly, it was found that even an increase in temperature of ~10° F. over stream 15 can be significant and beneficial. The residence time of the ethylene polymer particles in the fluidized bed heater 40 is relatively short, often from 1 to 30 minutes, or from 2 to 10 minutes. The particles are fluidized by hot fluidizing gas 55 (e.g., at reaction temperature or about 20° F. greater than the reaction temperature), which can contain nitrogen, ethylene, and the like, as well as the gas 95 that exits the flash chamber. Combinations of more than one source for the fluidizing gas can be used. The fluidizing gas exiting 65 the heater 40 can be recycled or re-used.

The fluidized bed heater 40 can operate at any suitable pressure, and can be in the same pressure ranges as noted above for the flash chamber, as well as lower pressures. While not a primary focus of the heater 40, an additional portion of volatiles that are entrained/absorbed into the solids particles can be removed, and these volatiles depart with the fluidizing gas exiting 65 the heater 40.

Beneficially, feed stream 25 contains solid ethylene polymer particles that have an elevated solids temperature at the entrance of the purge column 50. It is beneficial for there to be at least a 10° F. increase in temperature of the solid particles—as compared to line 15 exiting the flash chamber 30. More desirable is a temperature of the polymer solids in stream 25 which is at or above the reaction temperature, such as up to approximately 10 to 20° F. greater than the reaction temperature. Compositionally, stream 25 contains solid polymer particles with a volatile content somewhat less than in stream 15, often by approximately 1 to 20% on a relative percent basis.

The purge column 50 generally operates at low pressure, from ambient to about 10 psig in some aspects, and from ambient to about 5 psig in other aspects. If the solids temperature is not sufficiently high to facilitate significant volatile removal (to less than 100 ppmw, or to less than 20 ppmw), the residence time can be unacceptable high (e.g., 1-4 hours). Further, the column size can be very large and the volume of stripping gas exceedingly large as well. With the increased solids temperature due to the fluidized bed heater 40, the residence time can be reduced to about 15-90 minutes, the column size can be reduced (smaller purge columns), and significantly less stripping gas is required.

The temperature of the stripping gas 75 entering the purge column can be generally near the reaction temperature, for example, within 10° F. above or below the reaction temperature. The stripping gas can comprise nitrogen and/or ethylene, but is not limited thereto, and can be recovered in an exit stream 85 and re-used.

Optionally, a catalyst deactivating agent can be present in the stripping gas 75 in the purge column. Alternatively, a catalyst deactivating agent can be present in the fluidizing gas 55. Air or a small percentage of oxygen can be used, although other catalyst deactivating agents can be used.

Polymer solids stream 35 exits the purge column 50 and contains less than 100 ppmw of volatile components. In some instances, the volatile content of the polymer solids stream 35 can be less than 40, less than 20, or less than 10 ppmw. The polymer solids stream 35 is fed to the extruder 60 to form solid polymer pellets 45. Optionally, a catalyst deactivating agent (e.g., air) can be added to the polymer solids stream 35 prior to extrusion/pelletizing.

Figure 2:
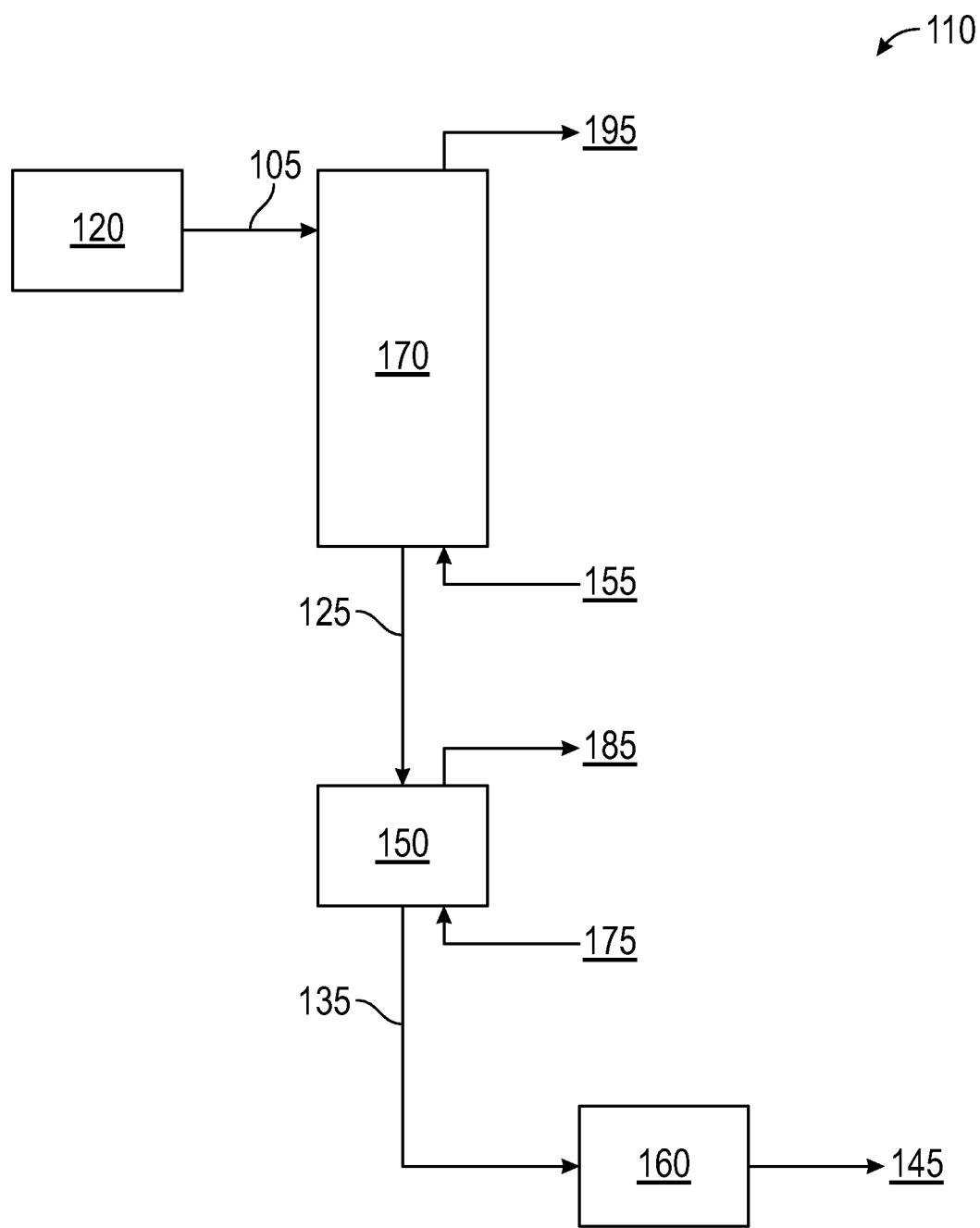
FIG. 2 illustrates a polyethylene recovery and volatile removal system consistent with another aspect of the present invention.

Referring now to FIG. 2, which illustrates another polyethylene recovery and volatile removal system 110 consistent with an aspect of the present invention. The system 110 can include a heated fluidized bed flash chamber 170, a purge column 150, and an extruder 160. Related to the system 110 is a reactor 120, such as a gas phase or loop slurry reactor, from which an effluent stream 105 enters the heated fluidized bed flash chamber 170 in the polyethylene recovery and volatile removal system 110. The reactor 120, effluent 105, purge column 150, extruder 160, and streams 135, 145, 175, and 185 are generally the same as described for the similarly numbered components in FIG. 1.

In FIG. 2, the heated fluidized bed flash chamber 170 often operates at a pressure in a range of from 1 to 20 psig, or from 2 to 15 psig. Any suitable design for the heated fluidized bed flash chamber can be used, and volatile removal and solid product separation can be achieved using a cyclone design, with or without separation by gravity. Stream 195 is the volatile stream that exits the flash chamber.

The stream 125 exiting the heated fluidized bed flash chamber 170 enters the purge column 150. After exiting the heated fluidized bed flash chamber 170 and prior to entering the purge column 150, the volatile content of stream 125 has been reduced significantly, as compared to effluent stream 105. For a loop slurry reactor, stream 125 often contains ethylene polymer particles and generally 0.5 to 10 wt. % volatile components, whereas for a gas phase reactor, stream 125 often contains ethylene polymer particles and generally 0.5 to 5 wt. % volatile components. Some of the volatile components are entrained/absorbed into the ethylene polymer particles.

The heated fluidized bed flash chamber 170 is designed to increase the temperature of the solid ethylene polymer particles in stream 125 prior to the entering the purge column. Beneficially, feed stream 125 contains solid ethylene polymer particles that have an elevated solids temperature at the entrance of the purge column 150. Often, the solids temperature is approximately 20° F. less than the reaction temperature to at or above the reaction temperature, such as up to approximately 10 to 20° F. greater than the reaction temperature. The residence time of the ethylene polymer particles in the heated fluidized bed flash chamber 170 is relatively short, often from 1 to 30 minutes, or from 2 to 10 minutes. The particles are fluidized by hot fluidizing gas 155 (e.g., at reaction temperature or about 20° F. greater than the reaction temperature), which can contain nitrogen, ethylene, and the like, as well as the gas 195 that exits the heated fluidized bed flash chamber 170. Combinations of more than one source for the fluidizing gas can be used. The fluidizing gas exiting 195 the heated fluidized bed flash chamber 170 can be recycled or re-used.

Polymerization Processes and Reactor Systems

Also encompassed herein are ethylene polymerization processes and polymerization reactor systems. An ethylene polymerization process consistent with this invention can comprise (1) contacting a catalyst composition with ethylene and an optional olefin comonomer in an ethylene polymerization reactor under polymerization reaction conditions in a polymerization reactor system to produce an ethylene polymer effluent stream, and (2) conducting any method for removing volatile components from the ethylene polymer effluent stream disclosed herein. A polymerization reactor system consistent with this invention can comprise (1) any polyethylene recovery and volatile removal system disclosed herein, and (2) the ethylene polymerization reactor, wherein the ethylene polymerization reactor is configured to contact a catalyst composition with ethylene and an optional olefin comonomer to produce the ethylene polymer effluent stream.

The polymerization processes and reactor systems disclosed herein are applicable to any catalyst composition or catalyst system (e.g., any transition metal-based catalyst system) suitable for the polymerization of an olefin monomer, such as ethylene. The catalyst system can comprise, for example, a transition metal (one or more than one) from Groups 3-10 of the Periodic Table of the Elements. In one aspect, the catalyst composition can comprise a Group 4, 5, or 6 transition metal, or a combination of two or more transition metals. The catalyst system can comprise chromium, titanium, zirconium, hafnium, vanadium, or a combination thereof, in some aspects, or can comprise chromium, titanium, zirconium, hafnium, or a combination thereof, in other aspects. Accordingly, the catalyst composition can comprise chromium, or titanium, or zirconium, or hafnium, either singly or in combination. Thus, catalyst compositions comprising two or more transition metal compounds, wherein each transition metal compound independently can comprise chromium, titanium, zirconium, hafnium, vanadium, or a combination thereof, are contemplated and encompassed herein.

Various catalyst compositions known to a skilled artisan are useful in the polymerization of olefins. These include, but are not limited to, Ziegler-Natta based catalyst systems, chromium-based catalyst systems, metallocene-based catalyst systems, non-metallocene based catalyst systems (or post-metallocene based catalyst systems), and the like, including combinations thereof. The polymerization processes and reactor systems disclosed herein are not limited to the aforementioned catalyst systems, but nevertheless, particular aspects directed to these catalyst systems are contemplated. Hence, the catalyst composition can be a Ziegler-Natta based catalyst system, a chromium-based catalyst system, and/or a metallocene-based catalyst system; alternatively, a Ziegler-Natta based catalyst system; alternatively, a chromium-based catalyst system; alternatively, a metallocene-based catalyst system; or alternatively, a non-metallocene based catalyst system (or a post-metallocene based catalyst system). In one aspect, the catalyst composition can be a dual catalyst system comprising at least one metallocene compound, while in another aspect, the catalyst composition can be a dual catalyst system comprising two different metallocene compounds.

Examples of representative and non-limiting catalyst compositions include those disclosed in U.S. Pat. Nos.

3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 4,939,217, 5,210,352, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, 7,312,283, 7,026,494, 7,041,617, 7,199,073, 7,226,886, 7,517,939, 7,619,047, 7,919,639, and 8,080,681, each of which is incorporated herein by reference in its entirety.

In some aspects, the catalyst composition, in addition to a transition metal compound, can contain an activator and an optional co-catalyst. Illustrative activators can include, but are not limited to, aluminoxane compounds, organoboron or organoborate compounds, ionizing ionic compounds, activator-supports (e.g., solid oxides treated with an electron-withdrawing anion), and the like, or combinations thereof. Commonly used polymerization co-catalysts can include, but are not limited to, metal alkyl, or organometal, co-catalysts, with the metal encompassing boron, aluminum, and the like. For instance, alkyl boron and/or alkyl aluminum compounds often can be used as co-catalysts in a transition metal-based catalyst system. Representative compounds can include, but are not limited to, tri-n-butyl borane, tripropylborane, triethylborane, trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, including combinations thereof. In these and other aspects, the transition metal compound can comprise a metallocene compound and/or a chromium compound. The metallocene compound can be a bridged metallocene or an unbridged metallocene compound.

In some aspects, the transition metal-based catalyst composition can comprise (or consist essentially of, or consist of) a transition metal supported on, impregnated onto, and/or mixed or cogelled with a carrier. The transition metal compound, whether a metallocene compound, chromium compound, or other, can be supported on, impregnated onto, and/or mixed or cogelled with any of a number of porous carriers including, but not limited to, solid oxides, activator-supports (chemically-treated solid oxides), molecular sieves and zeolites, clays and pillared clays, and the like. For example, the transition metal-based catalyst composition can comprise chromium impregnated onto silica, chromium impregnated onto silica-titania, chromium impregnated onto aluminophosphate, chromium cogelled with silica, chromium cogelled with silica-titania, or chromium cogelled with aluminophosphate, and this includes any combinations of these materials.

In some aspects, the catalyst composition can comprise a metallocene catalyst component, while in other aspects, the catalyst composition can comprise a first metallocene catalyst component and a second metallocene catalyst component. The catalyst systems can contain an activator and, optionally, a co-catalyst. Any metallocene component of the catalyst compositions provided herein can, in some aspects, comprise an unbridged metallocene; alternatively, an unbridged zirconium or hafnium based metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047, the disclosures of which are incorporated herein by reference in their entirety.

In other aspects, any metallocene component of the catalyst compositions provided herein can comprise a bridged metallocene compound, e.g., with titanium, zirconium, or hafnium, such as a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group, on a cyclopentadienyl-type group (e.g., a cyclopentadienyl group or a fluorenyl group), or on the bridging group and the cyclopentadienyl-type group. In another aspect, the metallocene catalyst component can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group, on a cyclopentadienyl-type group, or on both the bridging group and the cyclopentadienyl group. Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047, the disclosures of which are incorporated herein by reference in their entirety.

In the polymerization processes and reactor systems disclosed herein, the catalyst composition can be contacted with ethylene (to form an ethylene homopolymer) or with ethylene and an olefin comonomer (to form an ethylene copolymer, ethylene terpolymer, etc.). Suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect, the olefin comonomer can comprise an α-olefin (e.g., a $C_3$-$C_{10}$ α-olefin), while in another aspect, the comonomer can comprise propylene, 1-butene, 1-pentene, 1-hexene, 1-octene, 1-decene, styrene, or any combination thereof; or alternatively, the olefin comonomer can comprise 1-butene, 1-hexene, 1-octene, or a combination thereof.

Accordingly, in the polymerization processes and reactor systems disclosed herein, the ethylene polymer effluent stream (or polymer solids, or polymer solids stream, or solid polymer pellets) can comprise an ethylene homopolymer and/or an ethylene/α-olefin copolymer (e.g., a $C_3$-$C_{10}$ α-olefin) in one aspect, and can comprise an ethylene homopolymer, an ethylene/1-butene copolymer, an ethylene/1-hexene copolymer, and/or an ethylene/1-octene copolymer in another aspect.

The disclosed processes and systems are intended for any polymerization process and reactor system in which an ethylene polymer effluent stream is discharged from a gas phase reactor or a loop slurry reactor. Thus, the ethylene polymerization reactor in the disclosed processes and systems can comprise a gas phase reactor or, alternatively, a loop slurry reactor. The polymerization conditions for these reactor types are well known to those of skill in the art. Gas phase reactors can comprise fluidized bed reactors or staged horizontal reactors. Slurry reactors can comprise vertical or horizontal loops. The reactor can be operated batchwise or continuously, and continuous processes can use intermittent or continuous product discharge. Polymerization reactor systems and processes also can include partial or full direct recycle of unreacted monomer, unreacted comonomer (if used), or diluent (if used).

The polymerization reactor system can comprise a single reactor (gas phase or loop slurry) or multiple reactors (for example, 2 reactors, or more than 2 reactors). For instance, the polymerization reactor system can comprise multiple loop reactors, multiple gas phase reactors, or a combination of loop and gas phase reactors (e.g., in series). Thus, the polymerization reactor system can comprise a series of a loop reactor followed by a gas phase reactor, or a series of a gas phase reactor followed by a loop slurry reactor, or a series of a gas phase reactor followed by the polyethylene recovery and volatile removal system and then followed by another reactor (e.g., a loop slurry reactor), and so forth.

According to one aspect, the polymerization reactor system can comprise at least one loop slurry reactor comprising vertical or horizontal loops. Monomer, diluent (if used), catalyst, and comonomer (if used) can be continuously fed to a loop reactor where polymerization occurs. Generally, continuous processes can comprise the continuous introduction of monomer (and comonomer, if used), catalyst, and diluent into a polymerization reactor and the continuous removal from this reactor of a suspension comprising polymer particles and the diluent. In some aspects, the wt. % solids (based on reactor contents) in the loop reactor often can range from about 30 wt. % to about 55 wt. %, or from about 40 wt. % to about 70 wt. %. In other aspects, the wt. % solids in the loop reactor can be less than about 50 wt. %, less than about 40 wt. %, or less than about 30 wt. %, such as from about 25 wt. % to about 45 wt. %, or from about 30 wt. % to about 40 wt. %. The ethylene polymer effluent stream can contain, for instance, solid polymer, diluent, ethylene, and comonomer.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, an ethylene polymer effluent stream can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer. A suitable polymerization reaction temperature can be any temperature below the de-polymerization temperature according to the Gibbs Free energy equation. Typically, this includes from about 25° C. to about 280° C., for example, or from about 25° C. to about 175° C., depending upon the type of polymerization reactor. In some reactor systems, the polymerization reaction temperature generally can be within a range from about 60° C. to about 120° C., or from about 75° C. to about 115° C.

Suitable pressures will also vary according to the reactor and polymerization type. The pressure for liquid phase polymerizations in a loop reactor typically can be less than 1000 psig (6.89 MPa). The pressure for gas phase polymerization can be in the 200 psig (1.38 MPa) to 500 psig (3.45 MPa) range. High pressure polymerization in tubular or autoclave reactors generally can be conducted at about 20,000 psig (137.9 MPa) to 75,000 psig (517.1 MPa). Polymerization reactors also can be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Constructive Example 1

HDPE Produced in a Gas Phase Reactor

Constructive Example 1 is based on a mathematical model of the polyethylene recovery and volatile removal system shown in FIG. 1. A HDPE can be produced in a gas phase reactor 20 at a reaction temperature of 195° F. The effluent stream 5 from the gas phase reactor 20 contains HDPE solids and 14 wt. % volatile components, and enters the flash chamber 30 operating at a temperature of 175 to 185° F., and HDPE solids with 2.5 wt. % volatiles exit the flash chamber 30 via stream 15 at nominally the same temperature, approximately 180° F. After contact with fluidizing gas 55 at 215° F. and a residence time of 2-3 minutes in fluidized bed heater 40, the exiting polymer solids 25 are increased in temperature by at least 10° F. (to ~190° F.) over stream 15, and up to a temperature of about 215° F. Thus, instead of entering the purge column 50 directly from the flash chamber 30 via stream 15 at ~180° F., the polymer solids enter the purge column 50 from the fluidized bed heater 40 via stream 25 at a solids temperature of at least 190° F. and up to 215° F. In the purge column 50, the HDPE solids are contacted with stripping gas 75 at a temperature of 195° F. for a residence time of 45 minutes, reducing the volatile content in the polymer solids stream 35 to less than 25 ppmw.

Constructive Example 2

HDPE Produced in a Loop Slurry Reactor

Constructive Example 2 is based on a mathematical model of the polyethylene recovery and volatile removal system shown in FIG. 1. A HDPE can be produced in a loop slurry reactor 20 at a reaction temperature of 195° F. The effluent stream 5 from the loop slurry reactor 20 contains HDPE solids and 60 wt. % volatile components, and enters the flash chamber 30 operating at a temperature of 175 to 185° F., and HDPE solids with 5 wt. % volatiles exit the flash chamber 30 via stream 15 at a temperature in the 145 to 165° F. range (e.g., nominally 155° F.). After contact with fluidizing gas 55 at 215° F. and a residence time of 2-4 minutes in fluidized bed heater 40, the exiting polymer solids 25 are increased in temperature by at least 20° F. (to ~175° F.) over stream 15, and up to a temperature of about 215° F. Thus, instead of entering the purge column 50 directly from the flash chamber 30 via stream 15 at ~155° F., the polymer solids enter the purge column 50 from the fluidized bed heater 40 via stream 25 at a solids temperature of at least 175° F. and up to 215° F. In the purge column 50, the HDPE solids are contacted with stripping gas 75 at a temperature of 195° F. for a residence time of 45 minutes, reducing the volatile content in the polymer solids stream 35 to less than 25 ppmw.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A polyethylene recovery and volatile removal system comprising:

(a) a flash chamber for reducing the pressure of an ethylene polymer effluent stream from an ethylene polymerization reactor and for removing a first portion of volatile components from polymer solids, wherein the flash chamber is configured to form the polymer solids at a solids temperature from about 10° F. to about 50° F. less than a reaction temperature in the ethylene polymerization reactor;

(b) a fluidized bed heater for fluidizing the polymer solids and for heating the polymer solids to a solids temperature from at least about 10° F. above the solids temperature in (a) and up to about 20° F. greater than the reaction temperature, wherein the fluidized bed heater is configured to remove a second portion of the volatile components; and (c) a purge column for contacting the polymer solids with a stripping gas, wherein the purge column is configured to remove a third portion of the volatile components to form a polymer solids stream containing less than 100 ppmw (ppm by weight) of volatile components.

Aspect 2. The system defined in aspect 1, wherein the flash chamber reduces the pressure to about 2 about 10 psig when the ethylene polymerization reactor is a gas phase reactor, and to about 2 to about 400 psig (e.g., to about 2 to about 10 psig for a low pressure flash, to about 100 to about 200 psig for a high pressure flash, etc.) when the ethylene polymerization reactor is a loop slurry reactor.

Aspect 3. The system defined in aspect 1 or 2, wherein the first portion of volatile components is removed to form the polymer solids containing from about 0.5 to about 5 wt. % volatile components when the ethylene polymerization reactor is a gas phase reactor, and from about 0.5 to about 10 wt. % volatile components when the ethylene polymerization reactor is a loop slurry reactor.

Aspect 4. The system defined in any one of the preceding aspects, wherein a volatile content of the ethylene polymer effluent stream is from about 5 to about 25 wt. % volatile components when the ethylene polymerization reactor is a gas phase reactor, and from about 35 to about 70 wt. % volatile components when the ethylene polymerization reactor is a loop slurry reactor.

Aspect 5. The system defined in any one of the preceding aspects, wherein the solids temperature is from about 10° F.

to about 20° F. less than the reaction temperature in the ethylene polymerization reactor when the ethylene polymerization reactor is a gas phase reactor, and from about 30° F. to about 50° F. less than the reaction temperature in the ethylene polymerization reactor when the ethylene polymerization reactor is a loop slurry reactor.

Aspect 6. The system defined in any one of the preceding aspects, wherein the second portion of volatile components is removed to form the polymer solids containing less volatile components than the polymer solids in (a) by any suitable amount, e.g., from about 1% to about 20% less volatile components.

Aspect 7. The system defined in any one of the preceding aspects, wherein the polymer solids are fluidized with a fluidizing gas comprising nitrogen, ethylene, flash chamber gas, a recycled fraction of the second portion of the volatile components removed in the fluidized bed heater, etc., or any combination thereof, at a temperature from about 10° F. less than to about 20° F. greater than the reaction temperature.

Aspect 8. The system defined in any one of the preceding aspects, wherein a residence time in the fluidized bed heater is any suitable residence time, e.g., from about 1 to about 30 minutes, from about 2 to about 10 minutes, etc.

Aspect 9. The system defined in any one of the preceding aspects, wherein the fluidized bed heater heats the polymer solids to a solids temperature from at least about 15° F. above the solids temperature in (a) and up to about 15° F. greater than the reaction temperature.

Aspect 10. The system defined in any one of the preceding aspects, wherein a pressure of the purge column is in any suitable range, e.g., from about 0 psig to about 10 psig, from about 0 psig to about 5 psig, etc.

Aspect 11. The system defined in any one of the preceding aspects, wherein a residence time in the purge column is any suitable residence time, e.g., from about 15 minutes to about 180 minutes, from about 15 to about 90 minutes, from about 20 to about 60 minutes, etc.

Aspect 12. The system defined in any one of the preceding aspects, wherein the stripping gas comprises nitrogen, ethylene, fuel gas, propane, ethane, etc., or any combination thereof, at a temperature from about 15° F. less than to about 15° F. greater than the reaction temperature.

Aspect 13. The system defined in any one of the preceding aspects, wherein the third portion of volatile components is removed to form the polymer solids stream containing less than about 40 ppmw, less than about 20 ppmw, less than about 10 ppmw, etc., of volatile components.

Aspect 14. A polyethylene recovery and volatile removal system comprising:

(A) a heated fluidized bed flash chamber for heating and for reducing the pressure of an ethylene polymer effluent stream from an ethylene polymerization reactor, and for removing an initial portion of volatile components from polymer solids, wherein the heated fluidized bed flash chamber is configured to form the polymer solids at a solids temperature from about 30° F. less to about 20° F. greater than a reaction temperature in the ethylene polymerization reactor; and (B) a purge column for contacting the polymer solids with a stripping gas, wherein the purge column is configured to remove a final portion of the volatile components to produce a polymer solids stream containing less than 100 ppmw of volatile components.

Aspect 15. The system defined in aspect 14, wherein the heated fluidized bed flash chamber reduces the pressure to any suitable pressure, e.g., from about 1 about 20 psig, from about 2 to about 15 psig, etc.

Aspect 16. The system defined in aspect 14 or 15, wherein the initial portion of volatile components is removed to form the polymer solids containing from about 0.5 to about 5 wt. % volatile components when the ethylene polymerization reactor is a gas phase reactor, and from about 0.5 to about 10 wt. % volatile components when the ethylene polymerization reactor is a loop slurry reactor.

Aspect 17. The system defined in any one of aspects 14-16, wherein a volatile content of the ethylene polymer effluent stream is from about 5 to about 25 wt. % volatile components when the ethylene polymerization reactor is a gas phase reactor, and from about 35 to about 70 wt. % volatile components when the ethylene polymerization reactor is a loop slurry reactor.

Aspect 18. The system defined in any one of aspects 14-17, wherein the solids temperature is from about 15° F. less to about 15° F. greater than a reaction temperature of the ethylene polymerization reactor.

Aspect 19. The system defined in any one of aspects 14-18, wherein the polymer solids are fluidized with a fluidizing gas comprising nitrogen, ethylene, a recycled fraction of the initial portion of the volatile components removed in the heated fluidized bed flash chamber, etc., or any combination thereof, at a temperature from about 10° F. less than to about 20° F. greater than the reaction temperature.

Aspect 20. The system defined in any one of aspects 14-19, wherein a residence time in the fluidized bed flash chamber is any suitable residence time, e.g., from about 1 to about 30 minutes, from about 2 to about 10 minutes, etc.

Aspect 21. The system defined in any one of aspects 14-20, wherein a pressure of the purge column is in any suitable range, e.g., from about 0 psig to about 10 psig, from about 0 psig to about 5 psig, etc.

Aspect 22. The system defined in any one of aspects 14-21, wherein a residence time in the purge column is any suitable residence time, e.g., from about 15 minutes to about 180 minutes, from about 15 to about 90 minutes, from about 20 to about 60 minutes, etc.

Aspect 23. The system defined in any one of aspects 14-22, wherein the stripping gas comprises nitrogen, ethylene, a recycled fraction of the initial portion of the volatile components removed in the heated fluidized bed flash chamber, etc., or any combination thereof, at a temperature from about 15° F. less than to about 15° F. greater than the reaction temperature.

Aspect 24. The system defined in any one of aspects 14-23, wherein the final portion of volatile components is removed to form the polymer solids stream containing less than about 40 ppmw, less than about 20 ppmw, less than about 10 ppmw, etc., of volatile components.

Aspect 25. The system defined in any one of the preceding aspects, wherein the system further comprises an extruder for converting the polymer solids stream into solid polymer pellets.

Aspect 26. The system defined in any one of the preceding aspects, wherein the system further comprises an injector for introducing a catalyst deactivating agent into the ethylene polymer effluent stream prior to the flash chamber.

Aspect 27. The system defined in any one of the preceding aspects, wherein the stripping gas and/or the fluidizing gas further comprises a catalyst deactivating agent.

Aspect 28. The system defined in any one of the preceding aspects, wherein the system further comprises an injector for introducing a catalyst deactivating agent into the polymer solids stream after the purge column.

Aspect 29. A method for removing volatile components from an ethylene polymer effluent stream from an ethylene polymerization reactor, the method comprising:

(i) reducing the pressure of the effluent stream to remove a first portion of the volatile components from polymer solids, the polymer solids having a solids temperature from about 10° F. to about 50° F. less than a reaction temperature in the ethylene polymerization reactor;

(ii) fluidizing the polymer solids while heating to increase the solids temperature from at least about 10° F. above the solids temperature in step (i) and up to about 20° F. greater than the reaction temperature, and wherein a second portion of the volatile components are removed; and (iii) contacting the polymer solids with a stripping gas to remove a third portion of the volatile components to form a polymer solids stream containing less than 100 ppm by weight of volatile components.

Aspect 30. The method defined in aspect 29, wherein the pressure in step (i) is reduced to about 2 about 10 psig when the ethylene polymerization reactor is a gas phase reactor, and to about 2 to about 400 psig (e.g., to about 2 to about 10 psig for a low pressure flash, to about 100 to about 200 psig for a high pressure flash, etc.) when the ethylene polymerization reactor is a loop slurry reactor.

Aspect 31. The method defined in aspect 30 or 31, wherein the first portion of volatile components is removed to form the polymer solids containing from about 0.5 to about 5 wt. % volatile components when the ethylene polymerization reactor is a gas phase reactor, and from about 0.5 to about 10 wt. % volatile components when the ethylene polymerization reactor is a loop slurry reactor.

Aspect 32. The method defined in any one of aspects 29-31, wherein a volatile content of the ethylene polymer effluent stream is from about 5 to about 25 wt. % volatile components when the ethylene polymerization reactor is a gas phase reactor, and from about 35 to about 70 wt. % volatile components when the ethylene polymerization reactor is a loop slurry reactor.

Aspect 33. The method defined in any one of aspects 29-32, wherein the solids temperature in step (i) is from about 10° F. to about 20° F. less than the reaction temperature in the ethylene polymerization reactor when the ethylene polymerization reactor is a gas phase reactor, and from about 30° F. to about 50° F. less than the reaction temperature in the ethylene polymerization reactor when the ethylene polymerization reactor is a loop slurry reactor.

Aspect 34. The method defined in any one of aspects 29-33, wherein the second portion of volatile components is removed to form the polymer solids containing less volatile components than the polymer solids in step (i) by any suitable amount, e.g., from about 1% to about 20% less volatile components.

Aspect 35. The method defined in any one of aspects 29-34, wherein the polymer solids are fluidized in step (ii) with a fluidizing gas comprising nitrogen, ethylene, flash chamber gas, a recycled fraction of the second portion of the volatile components removed in step (ii), etc., or any combination thereof, at a temperature from about 10° F. less than to about 20° F. greater than the reaction temperature.

Aspect 36. The method defined in any one of aspects 29-35, wherein step (ii) is conducted for any suitable time period, e.g., from about 1 to about 30 minutes, from about 2 to about 10 minutes, etc.

Aspect 37. The method defined in any one of aspects 29-36, wherein the solids temperature in step (ii) is from at least about 15° F. above the solids temperature in step (i) and up to about 15° F. greater than the reaction temperature.

Aspect 38. The method defined in any one of aspects 29-37, wherein step (iii) is conducted at a pressure in any suitable range, e.g., from about 0 psig to about 10 psig, from about 0 psig to about 5 psig, etc.

Aspect 39. The method defined in any one of aspects 29-38, wherein step (iii) is conducted for any suitable time period, e.g., from about 15 to about 90 minutes, from about 20 to about 60 minutes, etc.

Aspect 40. The method defined in any one of aspects 29-39, wherein the stripping gas comprises nitrogen, ethylene, etc., or any combination thereof, at a temperature from about 15° F. less than to about 15° F. greater than the reaction temperature.

Aspect 41. The method defined in any one of aspects 29-40, wherein the third portion of volatile components is removed to form the polymer solids stream containing less than about 40 ppmw, less than about 20 ppmw, less than about 10 ppmw, etc., of volatile components.

Aspect 42. A method for removing volatile components from an ethylene polymer effluent stream from an ethylene polymerization reactor, the method comprising:

(I) contacting the effluent stream with a fluidizing gas at a reduced pressure while heating to remove an initial portion of the volatile components from polymer solids, the polymer solids having a solids temperature from about 30° F. less to about 20° F. greater than a reaction temperature in the ethylene polymerization reactor; and (II) contacting the polymer solids with a stripping gas to remove a final portion of the volatile components to form a polymer solids stream containing less than 100 ppm by weight of volatile components.

Aspect 43. The method defined in aspect 42, wherein step (I) is conducted at any suitable pressure, e.g., from about 1 about 20 psig, from about 2 to about 15 psig, etc.

Aspect 44. The method defined in aspect 42 or 43, wherein the initial portion of volatile components is removed to form the polymer solids containing from about 0.5 to about 5 wt. % volatile components when the ethylene polymerization reactor is a gas phase reactor, and from about 0.5 to about 10 wt. % volatile components when the ethylene polymerization reactor is a loop slurry reactor.

Aspect 45. The method defined in any one of aspects 42-44, wherein a volatile content of the ethylene polymer effluent stream is from about 5 to about 25 wt. % volatile components when the ethylene polymerization reactor is a gas phase reactor, and from about 35 to about 70 wt. % volatile components when the ethylene polymerization reactor is a loop slurry reactor.

Aspect 46. The method defined in any one of aspects 42-45, wherein the solids temperature in step (I) is from about 15° F. less to about 15° F. greater than the reaction temperature of the ethylene polymerization reactor.

Aspect 47. The method defined in any one of aspects 42-46, wherein the polymer solids are fluidized in step (I) with a fluidizing gas comprising nitrogen, ethylene, etc., or any combination thereof, at a temperature from about 10° F. less than to about 20° F. greater than the reaction temperature.

Aspect 48. The system defined in any one of aspects 42-47, wherein step (I) is conducted for any suitable time period, e.g., from about 1 to about 30 minutes, from about 2 to about 10 minutes, etc.

Aspect 49. The method defined in any one of aspects 42-48, wherein step (II) is conducted at any suitable pressure, e.g., from about 0 psig to about 10 psig, from about 0 psig to about 5 psig, etc.

Aspect 50. The method defined in any one of aspects 42-49, wherein step (II) is conducted for any suitable time period, e.g., from about 15 to about 90 minutes, from about 20 to about 60 minutes, etc.

Aspect 51. The method defined in any one of aspects 42-50, wherein the stripping gas comprises nitrogen, ethylene, etc., or any combination thereof, at a temperature from about 15° F. less than to about 15° F. greater than the reaction temperature.

Aspect 52. The method defined in any one of aspects 42-51, wherein the final portion of volatile components is removed to form the polymer solids stream containing less than about 40 ppmw, less than about 20 ppmw, less than about 10 ppmw, etc., of volatile components. Aspect 53. The method defined in any one of aspects 29-52, further comprising a step of converting the polymer solids stream into solid polymer pellets.

Aspect 54. The method defined in any one of aspects 29-53, further comprising a step of introducing a catalyst deactivating agent into the ethylene polymer effluent stream prior to step (i) or step (I).

Aspect 55. The method defined in any one of aspects 29-54, wherein the stripping gas and/or the fluidizing gas further comprises a catalyst deactivating agent.

Aspect 56. The method defined in any one of aspects 29-55, further comprising a step of introducing a catalyst deactivating agent into the polymer solids stream after step (iii) or (II).

Aspect 57. An ethylene polymerization process comprising:
contacting a catalyst composition with ethylene and an optional olefin comonomer in the ethylene polymerization reactor under polymerization reaction conditions in a polymerization reactor system to produce an ethylene polymer effluent stream; and
conducting the method for removing volatile components from the ethylene polymer effluent stream defined in any one of aspects 29-56.

Aspect 58. A polymerization reactor system comprising:
the polyethylene recovery and volatile removal system defined in any one of aspects 1-28; and
the ethylene polymerization reactor, wherein the ethylene polymerization reactor is configured to contact a catalyst composition with ethylene and an optional olefin comonomer to produce the ethylene polymer effluent stream.

Aspect 59. The polymerization process or reactor system defined in any one of aspects 57-58, wherein the catalyst composition is contacted with ethylene and an olefin comonomer comprising a $C_3$-$C_{10}$ α-olefin.

Aspect 60. The polymerization process or reactor system defined in any one of aspects 57-59, wherein the catalyst composition is contacted with ethylene and an olefin comonomer comprising 1-butene, 1-hexene, 1-octene, or a mixture thereof.

Aspect 61. The polymerization process or reactor system defined in any one of aspects 57-60, wherein the ethylene polymerization reactor comprises the gas phase reactor.

Aspect 62. The polymerization process or reactor system defined in any one of aspects 57-60, wherein the ethylene polymerization reactor comprises the loop slurry reactor.

Aspect 63. The polymerization process or reactor system defined in any one of aspects 57-62, wherein the polymerization reactor system comprises two or more reactors.

Aspect 64. The polymerization process or reactor system defined in any one of aspects 57-63, wherein the ethylene polymer effluent stream (or polymer solids, or polymer solids stream, or solid polymer pellets) comprise(s) an ethylene homopolymer and/or an ethylene/α-olefin copolymer (e.g., a $C_3$-$C_{10}$ α-olefin).

Aspect 65. The polymerization process or reactor system defined in any one of aspects 57-64, wherein the ethylene polymer effluent stream (or polymer solids, or polymer solids stream, or solid polymer pellets) comprise(s) an ethylene homopolymer, an ethylene/1-butene copolymer, an ethylene/1-hexene copolymer, and/or an ethylene/1-octene copolymer.

Aspect 66. The polymerization process or reactor system defined in any one of aspects 57-65, wherein the reaction temperature is in a range from about 60° C. to about 120° C., or from about 75° C. to about 115° C.

Aspect 67. The polymerization process or reactor system defined in any one of aspects 57-66, wherein the polymerization conditions comprise a reaction temperature in a range from about 60° C. to about 120° C., or from about 75° C. to about 115° C., and a polymerization reaction pressure in a range from about 200 to about 1000 psig (about 1.4 to about 6.9 MPa).

Aspect 68. The polymerization process or reactor system defined in any one of aspects 57-67, wherein the catalyst composition comprises a transition metal-based catalyst system.

Aspect 69. The polymerization process or reactor system defined in any one of aspects 57-68, wherein the catalyst composition is a chromium-based catalyst system, a Ziegler-Natta based catalyst system, a metallocene-based catalyst system, a non-metallocene based catalyst system, or any combination thereof.

Aspect 70. Solid polymer pellets produced by the polymerization process or reactor system defined in any one of aspects 57-69.

We claim:

1. A method for removing volatile components from an ethylene polymer effluent stream from an ethylene polymerization reactor, the method comprising:
   (i) reducing a pressure of the effluent stream to remove a first portion of the volatile components from polymer solids, the polymer solids having a solids temperature from about 10° F. to about 50° F. less than a reaction temperature in the ethylene polymerization reactor;
   (ii) fluidizing the polymer solids while heating to increase the solids temperature from at least about 10° F. above the solids temperature in step (i) and up to about 20° F. greater than the reaction temperature, and wherein a second portion of the volatile components are removed; and
   (iii) contacting the polymer solids with a stripping gas to remove a third portion of the volatile components to form a polymer solids stream containing less than 100 ppm by weight (ppmw) of volatile components.

2. The method of claim 1, wherein the ethylene polymerization reactor is a gas phase reactor, and wherein:
   a volatile content of the ethylene polymer effluent stream is from about 5 to about 25 wt. % volatile components;
   the pressure in step (i) is reduced to a range from about 2 to about 10 psig;
   the polymer solids contain from about 0.5 to about 5 wt. % volatile components in step (i) after the first portion of volatile components is removed;
   the solids temperature in step (i) is from about 10° F. to about 20° F. less than the reaction temperature; and
   the solids temperature in step (ii) is from at least about 15° F. above the solids temperature in step (i) and up to about 15° F. greater than the reaction temperature.

3. The method of claim 1, wherein the ethylene polymerization reactor is a loop slurry reactor, and wherein:
- a volatile content of the ethylene polymer effluent stream is from about 35 to about 75 wt. % volatile components;
- the pressure in step (i) is reduced to a range from about 2 to about 200 psig;
- the polymer solids contain from about 0.5 to about 10 wt. % volatile components in step (i) after the first portion of volatile components is removed;
- the solids temperature in step (i) is from about 30° F. to about 50° F. less than the reaction temperature; and
- the solids temperature in step (ii) is from at least about 15° F. above the solids temperature in step (i) and up to about 15° F. greater than the reaction temperature.

4. The method of claim 1, wherein the polymer solids are fluidized in step (ii) with a fluidizing gas having a temperature from about 10° F. less than to about 20° F. greater than the reaction temperature.

5. The method of claim 4, wherein step (ii) is conducted for a time period in a range from about 1 to about 30 minutes.

6. The method of claim 1, wherein the polymer solids stream contains less than about 40 ppmw of volatile components.

7. The method of claim 1, wherein:
- the stripping gas further comprises a catalyst deactivating agent;
- the polymer solids are fluidized in step (ii) with a fluidizing gas that further comprises a catalyst deactivating agent; or
- the method further comprises a step of introducing a catalyst deactivating agent into the polymer solids stream after step (iii).

8. An ethylene polymerization process comprising:
- prior to conducting the method for removing volatile components from the ethylene polymer effluent stream of claim 1, contacting a catalyst composition with ethylene and an optional olefin comonomer in the ethylene polymerization reactor under polymerization reaction conditions in a polymerization reactor system to produce the ethylene polymer effluent stream.

9. A method for removing volatile components from an ethylene polymer effluent stream from an ethylene polymerization reactor, the method comprising:
- (I) contacting the effluent stream with a fluidizing gas at a reduced pressure while heating to remove an initial portion of the volatile components from polymer solids, the polymer solids having a solids temperature from about 30° F. less to about 20° F. greater than a reaction temperature in the ethylene polymerization reactor; and
- (II) contacting the polymer solids with a stripping gas to remove a final portion of the volatile components to form a polymer solids stream containing less than 100 ppm by weight of volatile components.

10. A polyethylene recovery and volatile removal system comprising:
- (a) a flash chamber for reducing a pressure of an ethylene polymer effluent stream from an ethylene polymerization reactor and for removing a first portion of volatile components from polymer solids, wherein the flash chamber is configured to form the polymer solids at a solids temperature from about 10° F. to about 50° F. less than a reaction temperature in the ethylene polymerization reactor;
- (b) a fluidized bed heater for fluidizing the polymer solids and for heating the polymer solids to a solids temperature from at least about 10° F. above the solids temperature in (a) and up to about 20° F. greater than the reaction temperature, wherein the fluidized bed heater is configured to remove a second portion of the volatile components; and
- (c) a purge column for contacting the polymer solids with a stripping gas, wherein the purge column is configured to remove a third portion of the volatile components to form a polymer solids stream containing less than 100 ppmw (ppm by weight) of volatile components.

11. The system of claim 10, wherein:
- the system further comprises an extruder for converting the polymer solids stream into solid polymer pellets; and
- the purge column is configured to form the polymer solids stream containing less than about 40 ppmw of volatile components.

12. The system of claim 10, wherein the system further comprises:
- an injector for introducing a catalyst deactivating agent into the ethylene polymer effluent stream prior to the flash chamber; or
- an injector for introducing a catalyst deactivating agent into the polymer solids stream after the purge column.

13. The system of claim 10, wherein:
- the fluidized bed heater is further configured to fluidize the polymer solids with a fluidizing gas comprising a catalyst deactivating agent and at least one of nitrogen, ethylene, flash chamber gas, or a combination thereof; or
- the purge column is further configured to contact the polymer solids with the stripping gas and a catalyst deactivating agent.

14. The system of claim 10, wherein the ethylene polymerization reactor is a gas phase reactor, and wherein:
- a volatile content of the ethylene polymer effluent stream is from about 5 to about 25 wt. % volatile components;
- the flash chamber is configured to reduce the pressure to from about 2 to about 10 psig;
- the flash chamber is configured to form the polymer solids at a solids temperature from about 10° F. to about 20° F. less than the reaction temperature;
- the flash chamber is further configured to form the polymer solids containing from about 0.5 to about 5 wt. % volatile components; and
- the fluidized bed heater is configured to heat the polymer solids to a solids temperature from at least about 15° F. above the solids temperature in the flash chamber and up to about 15° F. greater than the reaction temperature.

15. The system of claim 10, wherein the ethylene polymerization reactor is a loop slurry reactor, and wherein:
- a volatile content of the ethylene polymer effluent stream is from about 35 to about 70 wt. % volatile components;
- the flash chamber is configured to reduce the pressure to from about 2 to about 200 psig;
- the flash chamber is configured to form the polymer solids at a solids temperature from about 30° F. to about 50° F. less than the reaction temperature;
- the flash chamber is further configured to form the polymer solids containing from about 0.5 to about 10 wt. % volatile components; and
- the fluidized bed heater is configured to heat the polymer solids to a solids temperature from at least about 15° F.

above the solids temperature in the flash chamber and up to about 15° F. greater than the reaction temperature.

16. The system of claim 10, wherein:
the fluidized bed heater is configured to fluidize the polymer solids and to heat the polymer solids with a fluidizing gas having a temperature from about 10° F. less than to about 20° F. greater than the reaction temperature; and
the fluidized bed heater is configured for a residence time in a range from about 1 to about 10 minutes.

17. The system of claim 10, wherein:
the purge column is configured to contact the polymer solids with the stripping gas having a temperature from about 15° F. less than to about 15° F. greater than the reaction temperature; and
the purge column is configured for a residence time in a range from about 20 to about 60 minutes and an operating pressure of from about 0 to about 10 psig.

18. A polymerization reactor system comprising:
the polyethylene recovery and volatile removal system of claim 10; and
the ethylene polymerization reactor, wherein the ethylene polymerization reactor is configured to contact a catalyst composition with ethylene and an optional olefin comonomer to produce the ethylene polymer effluent stream.

19. The polymerization reactor system of claim 18, wherein:
the ethylene polymerization reactor is a loop slurry reactor or a gas phase reactor; and
the polymerization reactor system contains at least one reactor in addition to the ethylene polymerization reactor.

20. A polyethylene recovery and volatile removal system comprising:
(A) a heated fluidized bed flash chamber for heating and for reducing a pressure of an ethylene polymer effluent stream from an ethylene polymerization reactor, and for removing an initial portion of volatile components from polymer solids, wherein the heated fluidized bed flash chamber is configured to form the polymer solids at a solids temperature from about 30° F. less to about 20° F. greater than a reaction temperature in the ethylene polymerization reactor; and
(B) a purge column for contacting the polymer solids with a stripping gas, wherein the purge column is configured to remove a final portion of the volatile components to produce a polymer solids stream containing less than 100 ppmw of volatile components.

* * * * *